(12) United States Patent
Gajapala

(10) Patent No.: US 11,723,465 B2
(45) Date of Patent: Aug. 15, 2023

(54) AUTOMATICALLY ADJUSTING WRITING BOARD

(71) Applicant: Nadun Gajapala, Naperville, IL (US)

(72) Inventor: Nadun Gajapala, Naperville, IL (US)

(73) Assignee: Nadun Gajapala, Naperville, IL (US)

( * ) Notice: Subject to any disclaimer, the term of this patent is extended or adjusted under 35 U.S.C. 154(b) by 75 days.

(21) Appl. No.: 16/946,897

(22) Filed: Jul. 10, 2020

(65) Prior Publication Data

US 2022/0007835 A1    Jan. 13, 2022

(51) Int. Cl.
| | | |
|---|---|---|
| A47B 97/04 | (2006.01) | |
| F16M 11/42 | (2006.01) | |
| G06F 3/02 | (2006.01) | |
| F16M 11/18 | (2006.01) | |
| G06F 3/041 | (2006.01) | |
| F16M 11/04 | (2006.01) | |

(52) U.S. Cl.
CPC ........... *A47B 97/04* (2013.01); *F16M 11/046* (2013.01); *F16M 11/18* (2013.01); *F16M 11/42* (2013.01); *G06F 3/02* (2013.01); *G06F 3/041* (2013.01)

(58) Field of Classification Search
CPC ........... A47B 97/04; G06F 3/02; G06F 3/041; F16M 11/046; F16M 11/18; F16M 11/42
See application file for complete search history.

(56) References Cited

U.S. PATENT DOCUMENTS

| | | | | | |
|---|---|---|---|---|---|
| 4,797,106 | A | * | 1/1989 | Umehara | H04N 1/1017 434/408 |
| 7,439,956 | B1 | * | 10/2008 | Albouyeh | G06F 3/0208 361/679.09 |
| 2013/0314362 | A1 | * | 11/2013 | Miyano | G06F 3/04883 345/173 |
| 2013/0328819 | A1 | * | 12/2013 | Miyano | G06F 3/04883 345/173 |
| 2014/0121838 | A1 | * | 5/2014 | Ahn | G05D 3/00 700/275 |
| 2015/0163935 | A1 | * | 6/2015 | Kasuga | H05K 5/0234 361/807 |
| 2016/0282908 | A1 | * | 9/2016 | Holden | G06F 1/181 |
| 2019/0138054 | A1 | * | 5/2019 | Alva | G06F 1/1624 |
| 2021/0294553 | A1 | * | 9/2021 | Jackson | B43L 1/004 |

FOREIGN PATENT DOCUMENTS

| | | | |
|---|---|---|---|
| CN | 108682192 A | * | 10/2018 |
| KR | 102330793 B1 | * | 11/2021 |

\* cited by examiner

*Primary Examiner* — Kenneth Bukowski
(74) *Attorney, Agent, or Firm* — Ingenium Patents, LLC; Peter R. Kramer

(57) ABSTRACT

A display board, for writing and drawing with an interchangeable whiteboard, blackboard, or electronic surface that is pressure sensitive to a marker, chalk, or stylus through the use of a pressure sensitivity matrix. A software system implemented with the pressure sensitive matrix will be able to learn from the user's natural writing behavior, natural spaces and pauses in writing, and their writing size, and with these metrics, will be able to identify or predict a long pause in the action of writing. When this pause happens, the surface physically shifts upwards through the use of two linear actuators; the shift amount being determined by the user's writing size. The board is also able to shift upwards once the writer progresses to the opposite vertical edge of the drawing surface or can shift either upwards or downwards manually with two buttons on the side of the board.

6 Claims, 8 Drawing Sheets

AUTOMATICALLY ADJUSTING WRITING BOARD

BACKGROUND OF THE INVENTION

1. Field of the Invention

This invention is related to the field of visual aid systems, more specifically to the field of portable visual aid systems as well as mechanical visual aid systems.

2. Description of Related Art

Large writing boards have been a staple of classrooms, workplaces, and colleges for numerous decades, and have evolved vastly throughout history from chalkboards to whiteboards to electronic writing boards. There has been evolution in the sense of its portability, as there are many writing boards in the market that can be physically moved around a room as well as having height adjustments. What these current boards lack, however, is an automated height adjustment component to ease the process of writing. There are countless individuals in the world suffering with physical disabilities that may hinder their work performance, especially for individuals who constantly need to write on writing boards for their own benefits or for others. These individuals, such as teachers, professors, scientists, and mathematicians, with physical disabilities may have a hard time reaching higher parts of a writing board without having to manually readjust their position or the board's position. With a board that can continually shift upwards, classroom, lecture, and meeting functions can be improved as raising the board upwards can help individuals located further away from the board see content clear from obstructions. Current solutions to this issue include portable writing boards with manual adjustable heights, and cameras of a smaller writing surface that stream to a projector, but these manual adjustments can be time consuming, and sitting behind a desk with a writing surface may hinder the connection and emphasis the individual wants to convey. Disabled individuals may also need assistance to readjust a manually adjustable board, which creates an avoidable hassle with the following invention.

Patent WO2013012152A1 is similar to this application as it details a kiosk with a height adjustment function to automatically accommodate for different heighted individuals, however the present invention continually shifts upwards so that the user will only write in one vertical location for a session, rather than accommodating for a single height per session and staying at that given position as patent WO2013012152A1 seeks to accomplish. This key difference allows for a divergence of application between the present apparatus and patent WO2013012152A1.

DETAILED DESCRIPTION

Figure 1:
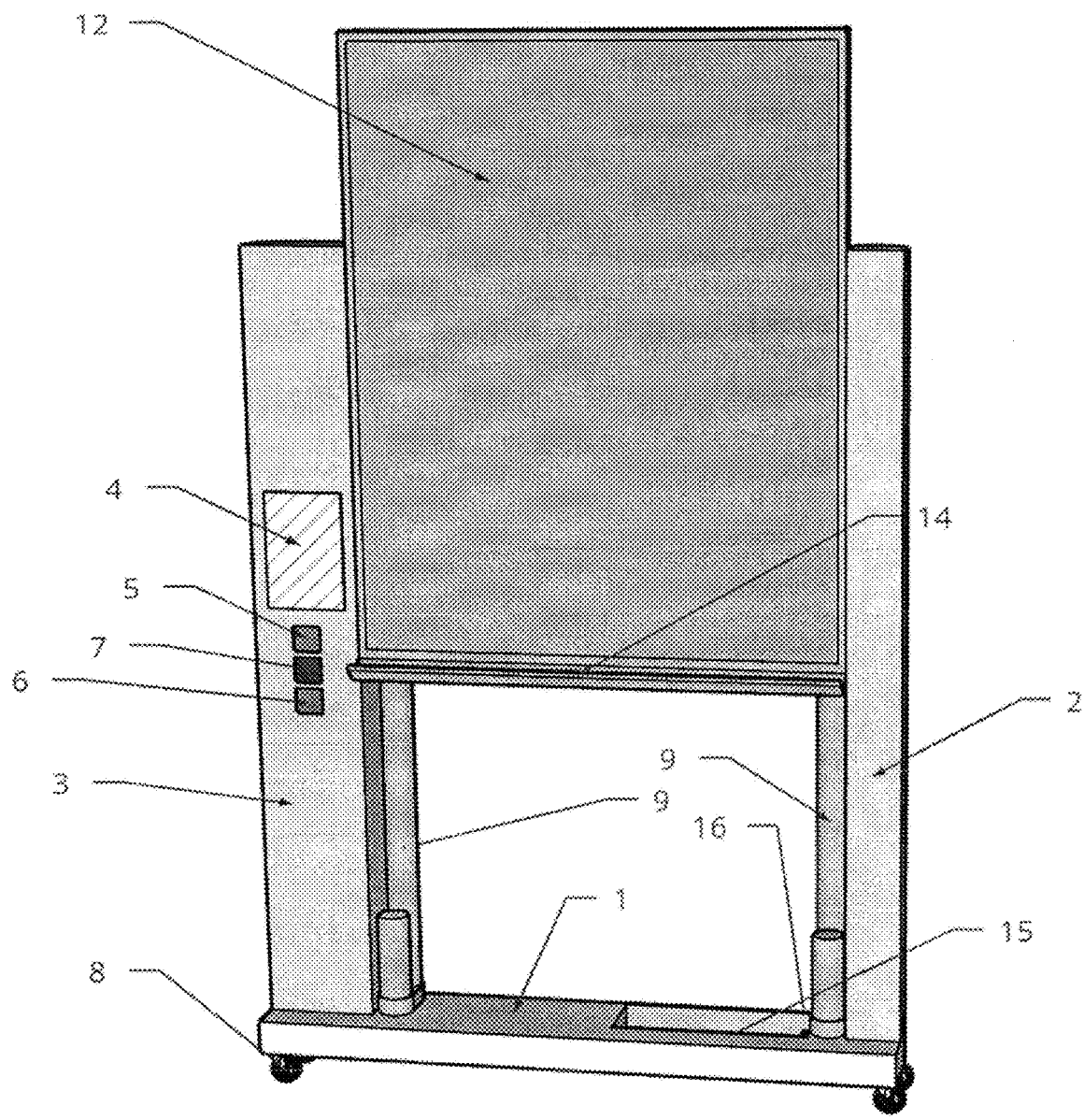
FIG. 1 is a front view of the drawing board system in the surface's middle state
Figure 2:
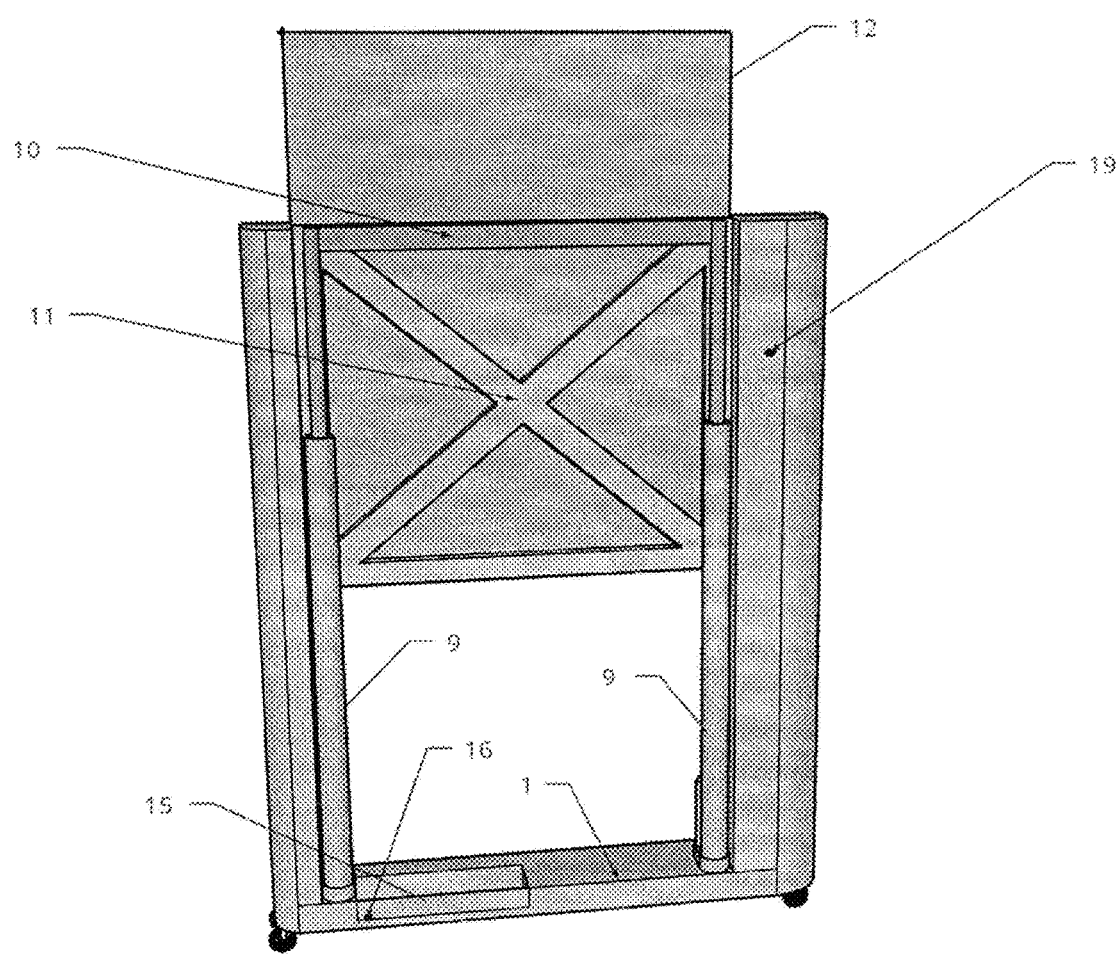
FIG. 2 is a rear view of the drawing board system in the surface's middle state
Figure 3:
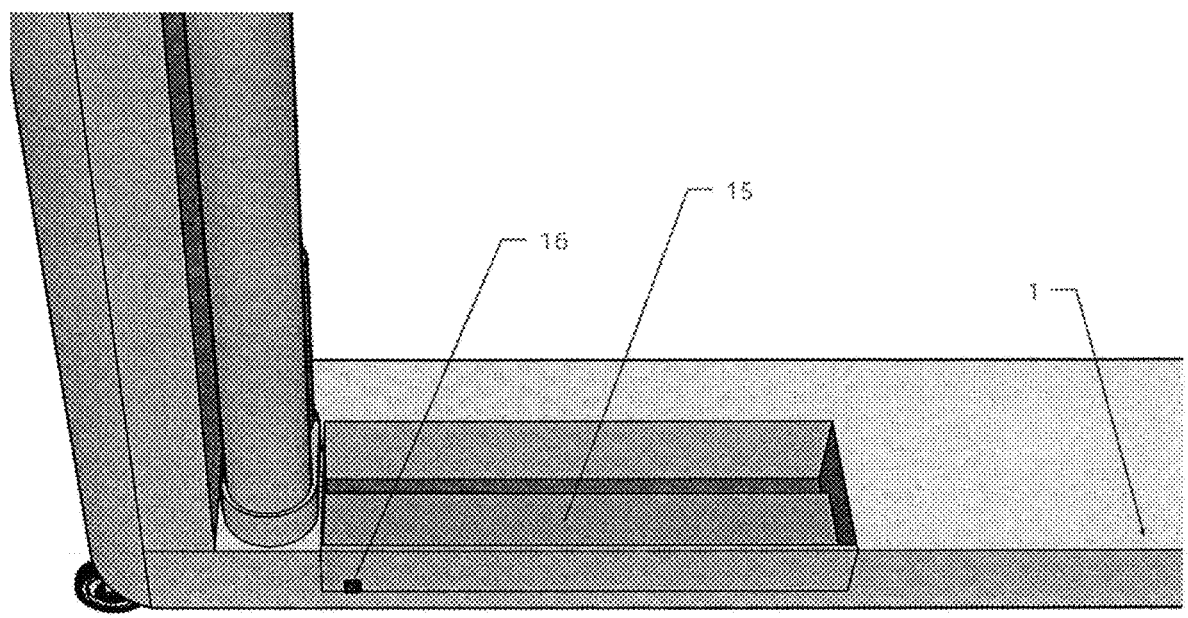
FIG. 3 is a closeup view of the battery and charging port
Figure 4:
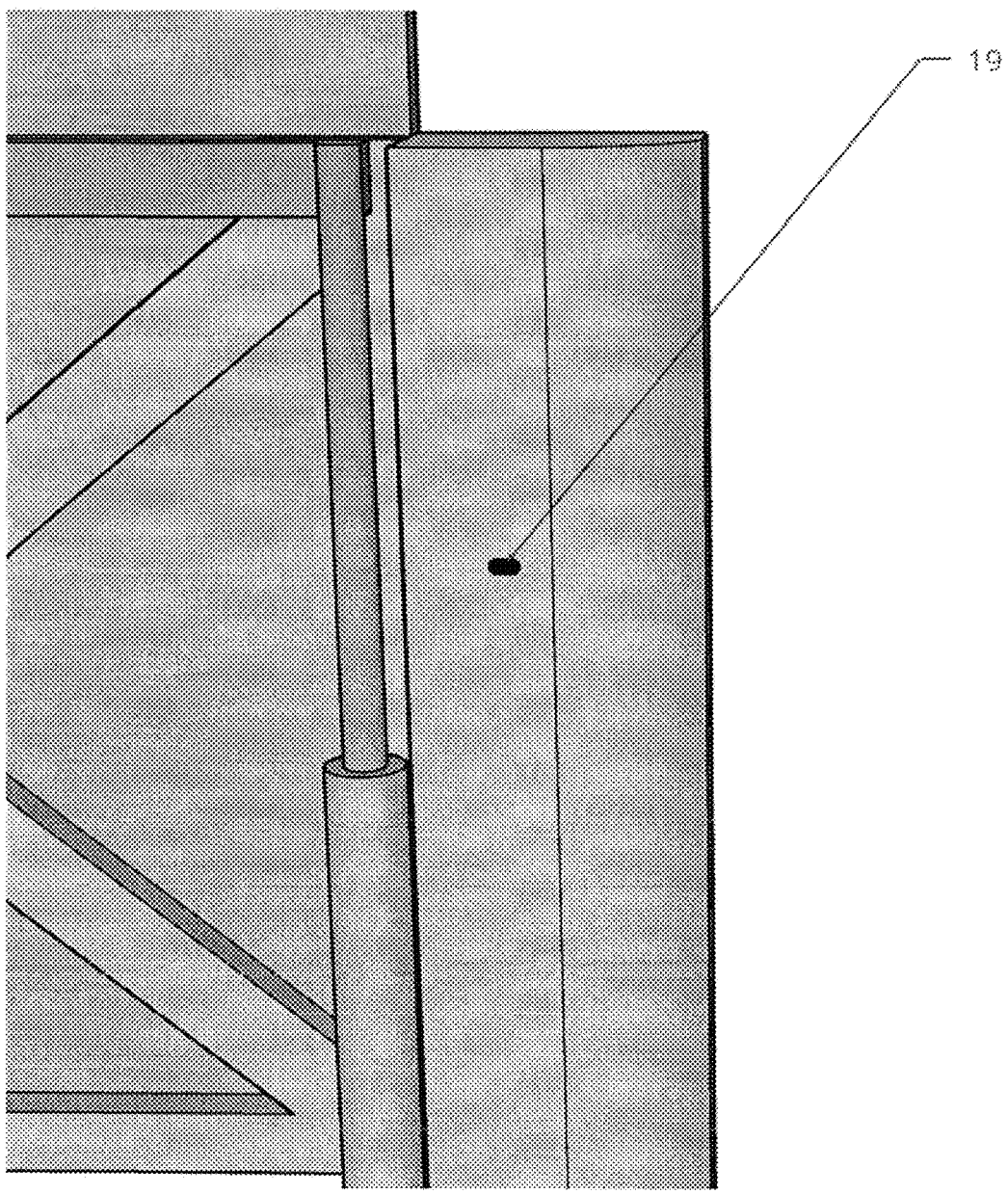
FIG. 4 is a closeup rear view of the left leg of the assembly
Figure 5:
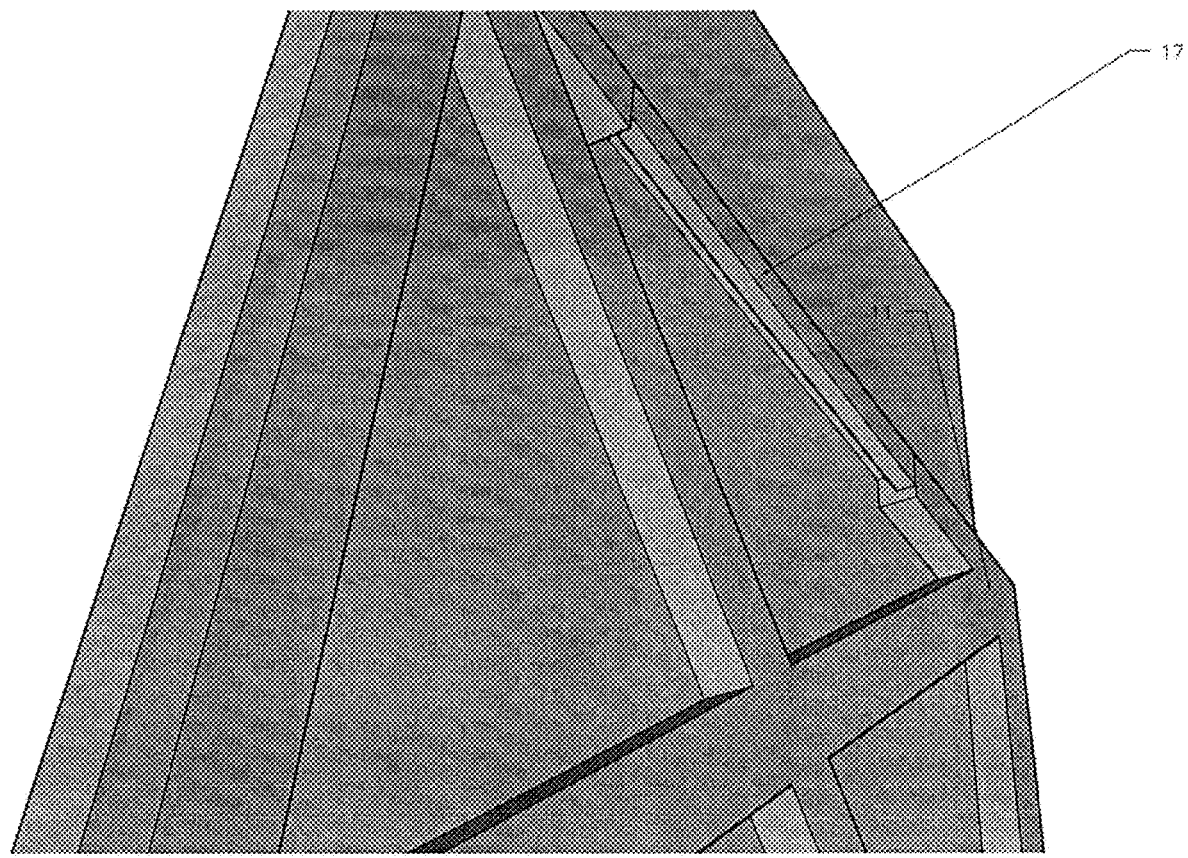
FIG. 5 is a rear view of the mounting bracket of the drawing surface
Figure 6:
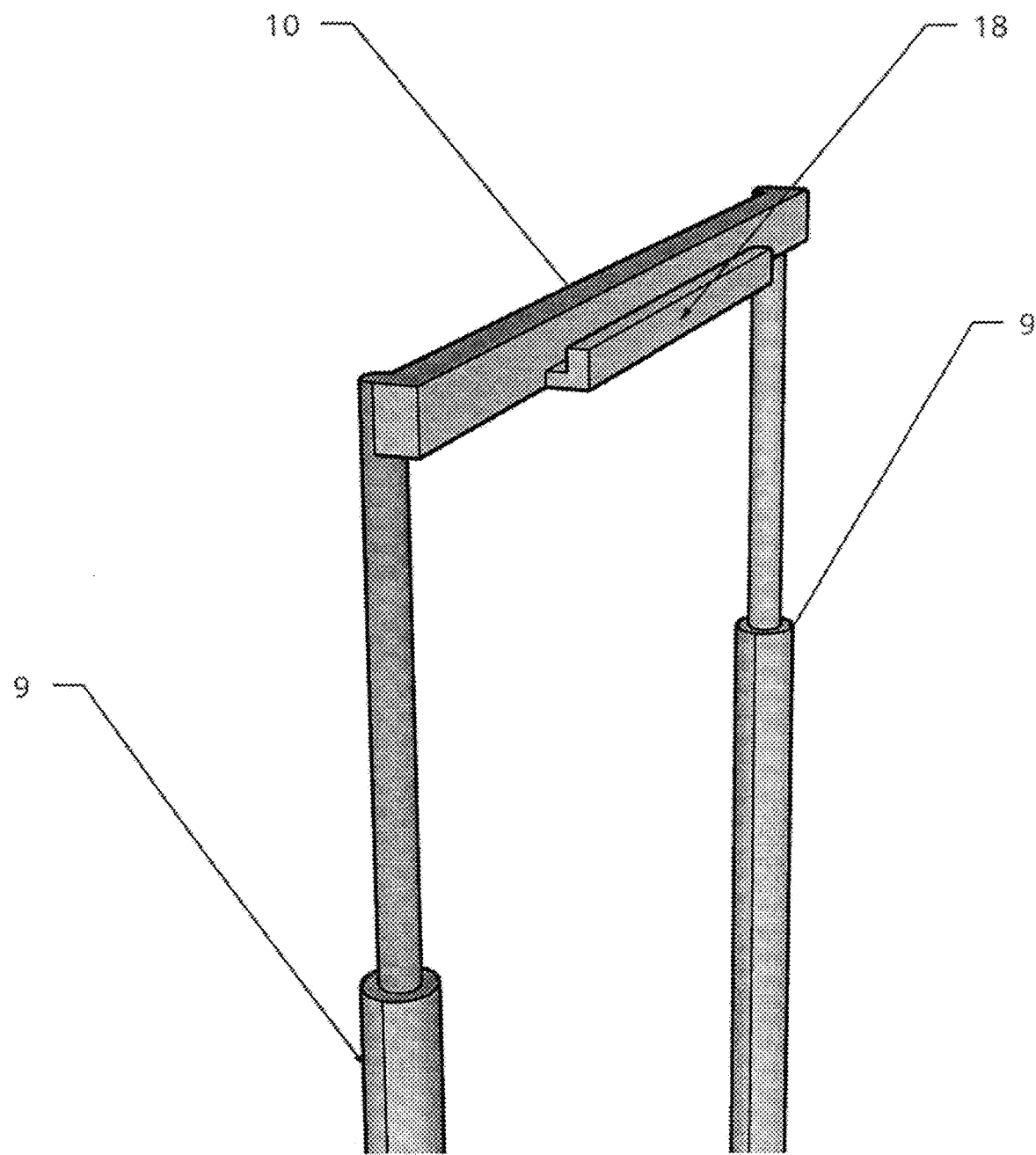
FIG. 6 is a side view of the mounting bracket of the lift system
Figure 7:
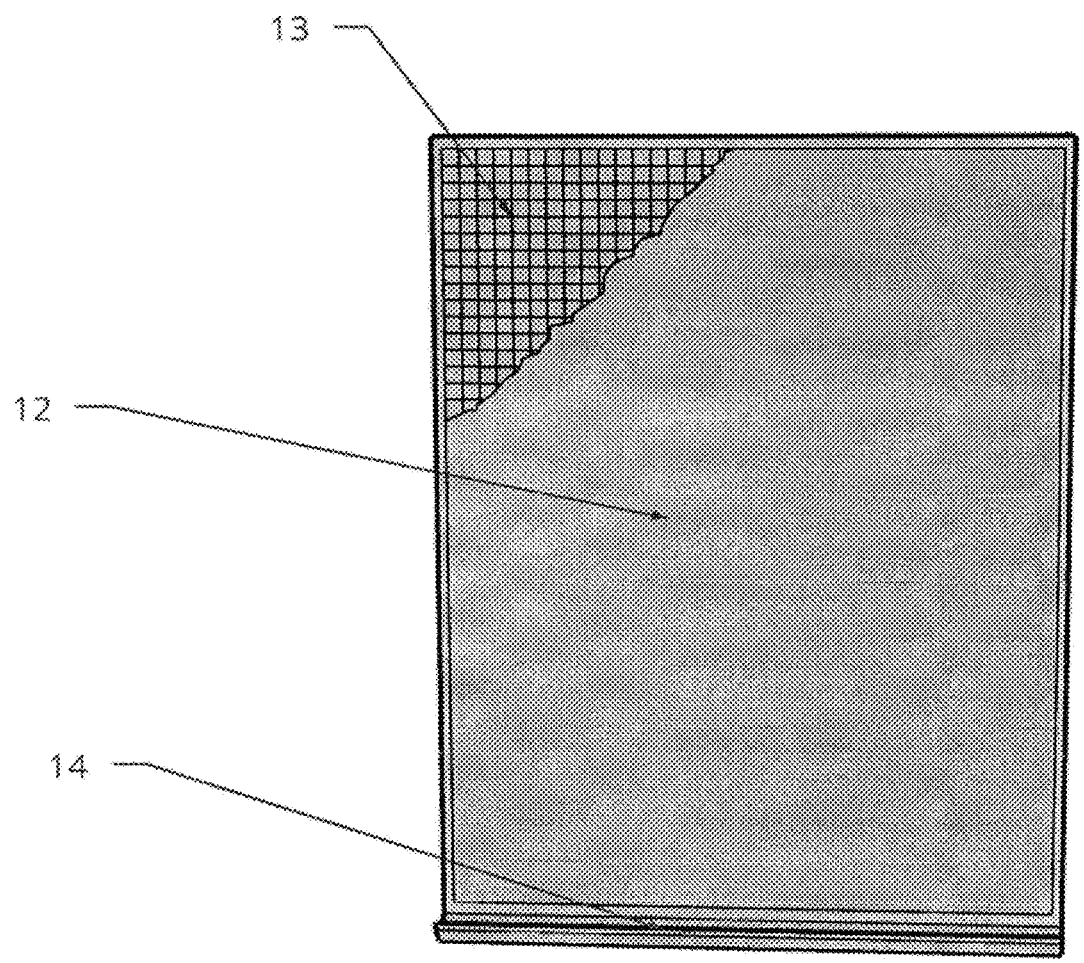
FIG. 7 is a front view of the drawing surface alone
Figure 8:
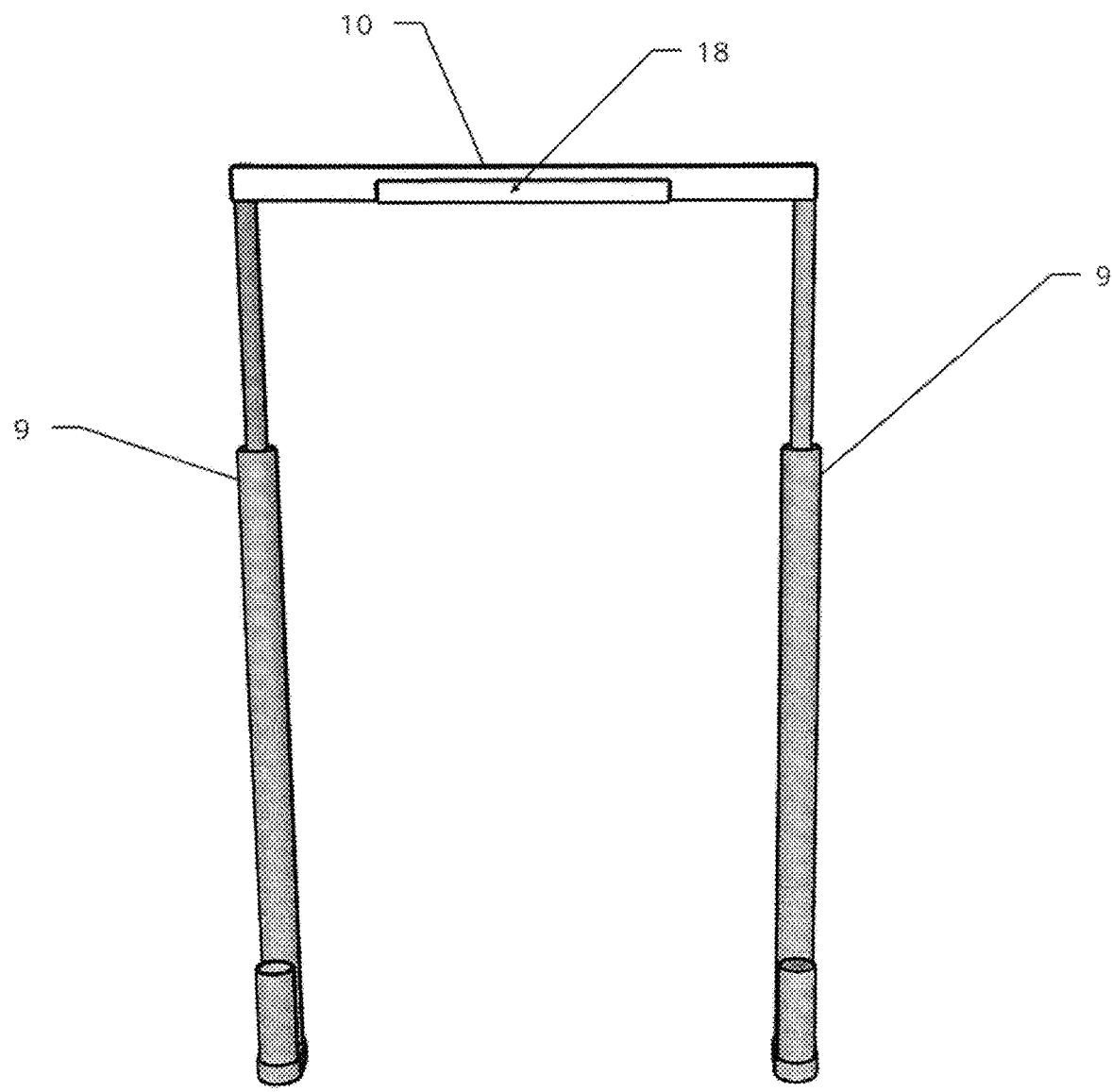
FIG. 8 is a front view of the lift system alone

The base (1), is the main support structure for the assembly, the left vertical side (3) is located on the left edge of the base, and the right vertical side (2) is located on the right edge of the base, and these edge elements serve as additional supports to the board's structure.

The writing surface (12) is able to mechanically move upwards and downwards through the use of two linear actuators (9); attached to opposite sides of the base (1) of the assembly and directly next to each of the vertical sides. The use of these linear actuators allows for the board to move vertically with precision and timeliness. The bulk of each actuators' components is attached to the base (1) of the board structure, while the rod end of the actuators that physically move are attached to a horizontal rod (10) that affixes to the backboard (11) of the writing surface through the use of a horizontal mounting bracket (18). The backboard (11), located behind the writing surface (12), reinforces the board's structure and has a horizontal mounting bracket (17) complimentary to the horizontal mounting bracket affixed to the lift assembly. The mounts allow for the timely interchangeability of writing surface type, from whiteboard to blackboard to electronic board.

The writing surface (12) has a marker containment surface (14) attached directly below to allow for convenient storage of writing utensils, and directly behind the surface is a pressure sensitive matrix (13) to detect when and where a writing utensil is being used. The information from this sensor is directly transmitted to the main computer of the board via the USB port (19), located on the left vertical side (3) of the assembly. The said touchscreen system in combination with machine learning software that learns over time the user's natural writing pattern, natural writing pauses, spacing between characters, and writing size allows the apparatus to learn to shift upwards automatically when the user either writes to the opposite vertical edge of the writing board or when an abnormally long pause for the individual is detected. The amount of vertical upward shift is determined by the user's writing size and shifts upward so that the user can write a next line of words at the same vertical location with comfortable spacing from the previous line. If this feature is disabled through the settings menu, along with other interactive interfaces through the touchscreen (4), the user can manually shift the board upwards with the upward shift button (5), downwards with the downward shift button (6), or lock the surface's position in place with the lock button (7).

The apparatus is cordless in the sense that it does not require to be plugged into a wall outlet to be used, instead drawing electricity from a rechargeable power supply (15) located in the base of the assembly. This power supply drives power to the pressure sensitive matrix, the linear actuators that move the board vertically, the touchscreen interface and buttons located on the left side of the assembly, and the main computer. If the power supply is low on charge, it may be charged through a charging port (16) located on the rear, and the board function is not compromised with a charger plugged in. Keeping the apparatus battery powered instead of having to be plugged into a wall outlet allows the board to be easily moveable throughout a room, and the wheels (8) on the bottom of the assembly further enhance the apparatus's portability.

I claim:

1. A support structure for a display board to display a user's writing and drawing, comprising:
   said display board having a writing surface,
   a base element,
   a first vertical element extending from a left edge of the base element, wherein the first vertical element comprising:
   a touchscreen interface on a front facing side of the first vertical element;
   a plurality of buttons allowing the user to shift said writing surface upwards, downwards, or lock the writing surface's position in place, wherein the writing surface is any one of a whiteboard, a blackboard, or an electronic surface;
   a computer to
     i) analyze and interpret data given by a pressure sensitive matrix beneath the writing surface,
     ii) accurately predict when to shift the display board's writing surface upwards, using the analyzed and interpreted data,
     iii) receive information from the plurality of buttons, and
     iv) operate the touchscreen interface,
   a second vertical element extending from a right edge of the base element;
   said writing surface positioned between said first vertical element and said second vertical element, and
   a plurality of wheels attached to a bottom facing side of the base element.

2. The support structure according to claim 1, wherein said support structure further comprising:
   a lift system apparatus, wherein the lift system apparatus is comprised of,
   one or more linear actuators affixed on the base element of said support structure, adjacent to the first and the second vertical elements of said support structure,
   a rod end of the linear actuator(s) attaching to a horizontal support element in assistance to the writing surface, and
   the horizontal support element with a mounting bracket to be able to attach and detach the writing surface.

3. The support structure according to claim 1, wherein the base element is further comprised of:
   a power source housed inside or affixed to said base element; and
   a charging port connected to said power source.

4. The support structure as in claim 1, wherein,
   the computer detects when to shift the writing surface by determining when the user's writing progresses to a vertical edge of the writing board.

5. The support structure as in claim 1, further comprising wherein said computer determines when to shift the writing surface by detecting an abnormally long pause by the user, said computer using machine learning software that learns to distinguish between natural pauses and abnormally long pauses of the user.

6. A support structure comprising:
   a base element,
   a left vertical side extending from a left edge of said base element,
   a right vertical side extending from a right edge of said base element,
   a plurality of wheels attached to a bottom facing side of said base element,
   a touchscreen interface on a front facing side of the left vertical element and/or on the right vertical element, said touchscreen having a touchscreen surface,
   a writing board, said writing board having a writing surface, said writing board positioned between said left vertical element and said right vertical element,
   a pressure-sensitive matrix, said pressure sensitive matrix positioned below the writing surface,
   a plurality of buttons that allow a user to shift the touchscreen's surface upwards, downwards, or lock the touchscreen's position in place, said plurality of buttons disposed on the left vertical element and/or on the right vertical element,
   a computer to analyze and interpret data given by the pressure sensitive matrix, for the purpose of accurately predicting when to shift the board upwards as well as receive information from the buttons and operate the touchscreen display,
   wherein said computer is configured to receive data from the pressure sensitive matrix via a USB port.

* * * * *